Figure 1:
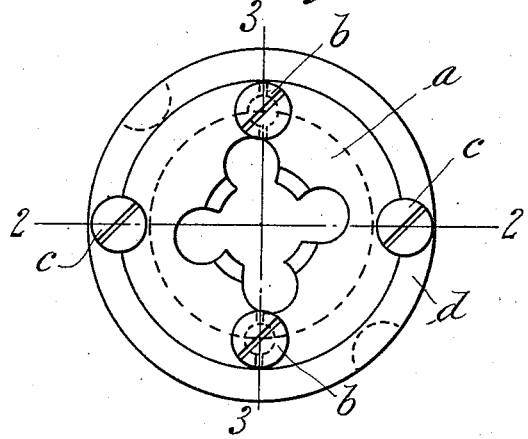

F. O. WELLS.
ADJUSTABLE TOOL.
APPLICATION FILED AUG. 12, 1912.

1,046,044.

Patented Dec. 3, 1912.

WITNESSES:
R. M. Mowry.
W. P. Noble.

INVENTOR,
Frank O. Wells,
BY Chapin & Co.
ATTORNEY.

COLUMBIA PLANOGRAPH CO., WASHINGTON, D. C.

UNITED STATES PATENT OFFICE.

FRANK O. WELLS, OF GREENFIELD, MASSACHUSETTS, ASSIGNOR TO GREENFIELD TAP & DIE CORPORATION, OF GREENFIELD, MASSACHUSETTS, A CORPORATION OF MASSACHUSETTS.

ADJUSTABLE TOOL.

1,046,044.  Specification of Letters Patent.  Patented Dec. 3, 1912.

Application filed August 12, 1912. Serial No. 714,531.

*To all whom it may concern:*

Be it known that I, FRANK O. WELLS, a citizen of the United States of America, residing at Greenfield, in the county of Franklin and State of Massachusetts, have invented new and useful Improvements in Adjustable Tools, of which the following is a specification.

This invention relates to an adjustable die.

Adjustable dies have heretofore been designed and used in which the die can be adjusted for wear so as to keep the exact size of the taps or the particular work in hand. A well known form of this kind of adjustable die is constructed in two parts and the die is held by a suitable collet. Taper headed screws are arranged between the two halves of the die so that when it is desired to expand or contract the die these taper headed screws are screwed in or out so that the two halves take the required size. The surrounding collet has means such as binding screws, there being usually four, two bearing against each half of the die and these are first loosened to allow the taper headed screws to move the die. After the die has been properly adjusted the taper headed screws are tightened to hold the die firmly in adjusted position in the collet. The binding screws on the collet lead in from the side thereof so that when the collet is held by a suitable handle or in a machine as is customary in using dies and it is necessary to adjust the die, the collet must be removed from the handle or holding means in order to get at the binding screws to carry out the adjusting operations as described.

In applicant's invention the collet and die are arranged with suitable adjusting devices so that after the collet and die are placed in the handle or in a holding device of a machine the desired adjustment of the die can take place without removing the collet and die from the handle of the machine. In order that this adjusting operation can take place the adjusting devices all extend to the face of the die and collet so that it will not be necessary to disturb the setting of these parts with relation to the holding device of the machine in any manner. The preferred arrangement is essentially as follows: The two halves of the die are held in the collet or stock. Taper headed screws for obtaining the adjustment are placed within the outside diameter of the die and between the two halves thereof. Similar taper headed binding screws are placed half in the die and half in the stock or collet with the heads extending to the face of the tool. When the binding screws are loosened the taper headed screws for adjusting the die can be operated and after the proper adjustment is made the binding screws are set very tight in order to hold the die in the collet. The heads of all the screws, both the adjusting and the binding screws extend to the face of the tool so that the adjustment takes place from the face of the tool in the convenient manner outlined.

The object of the invention is to provide an adjustable die of the kind described which will enable a quick, accurate adjustment and set up for machine or hand work.

The invention will appear in the detailed description and annexed claims as illustrative of applicant's preferred embodiment of the invention.

Figure 2:
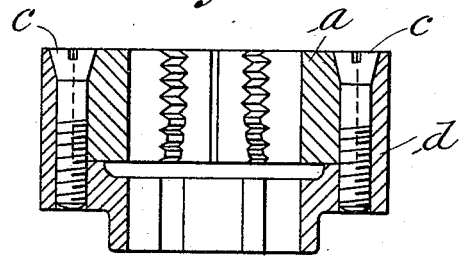
Figure 3:
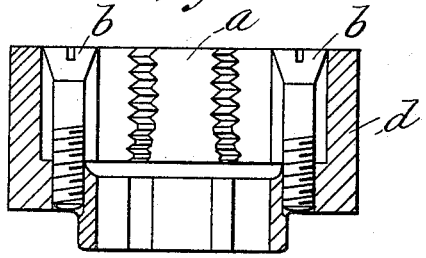

Referring to the drawings,—Figure 1 is a plan view of the assembled collet and die. Fig. 2 is a side sectional view of the same taken along the line 2—2 of Fig. 1. Fig. 3 is a side sectional view taken along the line 3—3 of Fig. 1.

The collet $d$ surrounds the circular die $a$, the latter made in two parts as indicated. The binding screws $c$—$c$ are arranged to engage half in the collet and half in the die, one binding screw engaging one-half of the die and the collet and the other binding screw engaging the other half of the die and the collet. The adjusting screws $b$—$b$ each engage half in one part and half in the other part of the die and by means of the tapered heads shown the die is adjusted by moving the taper headed adjusting screws in or out as desired. In order to adjust the die the binding screws $c$—$c$ are first loosened, the die is then adjusted by manipulating the taper headed adjusting screws $b$—$b$ as described. After the die has been adjusted or set up to the work, the binding screws $c$—$c$ are driven very tightly to their place and since they engage one-half in the collet and one-half in the die, the die is held firmly in place with the adjustment as made. It will be noted that with all the heads of the adjusting and binding screws extending to the face of the tool it will not be necessary to remove the tool from the machine or from the handle which holds it. Because of this fact a very quick adjustment can be made and much time saved from the use of the old form of adjustable die. Although the die is made in two halves where it is supported in the manner shown, it is as rigid as a solid die would be because of the rigid holding devices described. By means of the structure disclosed applicant is enabled to save a very material amount of time in the use of a die either in hand work or machine work.

What I claim, is:—

1. In an adjustable die the combination of a die made in two halves, a collet in which said die is held, adjusting screws arranged to engage both halves of the die along the division line thereto with the heads extending to the face of the die, binding screws each arranged to engage the die and collet with the heads extending to the face of the tool all constructed and arranged so that any necesary adjustment of the die can be made from the face of the tool in a convenient manner.

2. The combination in an adjustable tool of an expansible and contractible die, means operable to cause expansion or contraction of the die to adjust it to its work together with a collet, means operable to release or bind the die in the collet, said two mentioned means being operable from the face of the tool, all constructed and arragned so that the die can be adjusted as to size in the collet without moving the latter.

FRANK O. WELLS.

Witnesses:
 FREDK. H. PAYNE,
 FREDERICK W. STRECKER.

Copies of this patent may be obtained for five cents each, by addressing the "Commissioner of Patents, Washington, D. C."